United States Patent
Nakamura

[19]

[11] Patent Number: 5,828,145
[45] Date of Patent: Oct. 27, 1998

[54] BICYCLE GENERATOR-CONTAINING HUB AND A LIGHTING APPARATUS USING THE HUB

[75] Inventor: Kazunori Nakamura, Sakai, Japan

[73] Assignee: Shimano, Inc., Osaka, Japan

[21] Appl. No.: 586,380

[22] Filed: Jan. 16, 1996

[30]  Foreign Application Priority Data

Jan. 18, 1995  [JP]  Japan ................................. 7-005787

[51] Int. Cl.⁶ .............................. H02K 7/00; H02K 1/22; B60Q 1/00
[52] U.S. Cl. ......................... 310/67 A; 310/263; 362/192
[58] Field of Search ................... 362/192, 193, 362/72; 310/67 A, 263; 180/65.6

[56]  References Cited

U.S. PATENT DOCUMENTS

| | | | |
|---|---|---|---|
| 4,281,365 | 7/1981 | Elving et al. ............................. | 362/20 |
| 4,677,328 | 6/1987 | Kumakura ............................. | 310/67 R |
| 4,775,919 | 10/1988 | Pearsall et al. ........................... | 362/78 |
| 4,782,256 | 11/1988 | Kokubu .................................... | 310/83 |
| 4,860,176 | 8/1989 | Bauwens et al. ........................ | 362/72 |
| 4,893,877 | 1/1990 | Powell et al. ........................ | 310/108 R |
| 5,079,461 | 1/1992 | Schluter et al. ....................... | 310/67 A |
| 5,132,665 | 7/1992 | Hutchisson et al. .................... | 340/463 |
| 5,268,602 | 12/1993 | Schwaller .............................. | 310/67 A |
| 5,584,561 | 12/1996 | Lahos ..................................... | 362/72 |

FOREIGN PATENT DOCUMENTS

| | | | |
|---|---|---|---|
| 772814 | 11/1934 | France ........................... | H02K 21/22 |
| 2 356 301 | 1/1978 | France ........................... | H02K 21/22 |
| 2 392 525 | 12/1978 | France ........................... | H02K 21/22 |
| 4411145 A1 | 10/1994 | Germany ...................... | H02K 21/22 |

*Primary Examiner*—Steven L. Stephan
*Assistant Examiner*—Michael J. Wallace, Jr.
*Attorney, Agent, or Firm*—James A. Deland

[57]  ABSTRACT

A bicycle generator-containing hub having a hub spindle (6), a hub body (2) rotatably mounted on the hub spindle (6), and a generator (10) disposed inside the hub body (2).

The generator includes a cylindrical magnet assembly (12) having north poles and south poles arranged alternately along an inner peripheral wall of the hub body (2), and a plurality of generating coil units (11a, 11b, 11c) arranged inside the cylindrical magnet assembly (12) and axially of the hub spindle.

Each of the generating coil units includes a first core element (50a, 50b, 50c) and a second core element (60a, 60b, 60c) opposed to each other axially of the hub spindle, and a generating coil (14) disposed between the first and second core elements to be coaxial with the hub spindle. The first core element has magnetic poles (51a, 51b, 51c) arranged at intervals in peripheral positions thereof and extending toward the second core element. The second core element has magnetic poles (61a, 61b, 61c) arranged at intervals in peripheral positions thereof and extending toward the first core element.

An adjacent pair of the generating coil units are arranged to have the second core element (60a) of one generating coil unit (11a) in contact with the first core element (50b) of the other (11b), such that the magnetic poles (51a) of the first core element (50a) of the one generating coil unit (11a) and the magnetic poles (61b) of the second core element (60b) of the other generating coil unit (11b) are in corresponding positions circumferentially of the hub spindle.

9 Claims, 7 Drawing Sheets

BICYCLE GENERATOR-CONTAINING HUB AND A LIGHTING APPARATUS USING THE HUB

BACKGROUND OF THE INVENTION

1. Field of the Invention

The present invention relates a bicycle generator-containing hub having a hub spindle, a hub body rotatably mounted on the hub spindle, and a generator disposed inside the hub body, the generator comprising a cylindrical magnet assembly having north poles and south poles arranged alternately along an inner peripheral wall of the hub body, and a plurality of generating coil units arranged inside the cylindrical magnet assembly and axially of the hub spindle, each of the generating coil units including a first core element and a second core element opposed to each other axially of the hub spindle, and a generating coil disposed between the first and second core elements to be coaxial with the! hub spindle, wherein the first core element has magnetic poles arranged at intervals in peripheral positions thereof and extending toward the second core. element, and the second core element has magnetic poles arranged at intervals in peripheral positions thereof and extending toward the first core element.

The invention also relates to a lighting apparatus for a bicycle which uses the above generator-containing hub.

2. Description of the Related Art

In the above bicycle generator-containing hub, with the generating coil units arranged at intervals axially of the hub spindle, the generator is elongated by the intervals axially of the hub spindle. To avoid the extended length German Laying-Open Patent Publication DE4033890 shows an arrangement in which the second core element of one of adjacent generating coil units is in contact with the first core element of the other. With this arrangement, the generator has a reduced length axially of the hub spindle so that the entire hub has a compact construction. This prior art construction will be described in greater detail with reference to FIGS. 12A and 12B. In arranging a first generating coil unit 111a, a second generating coil unit 111b and a third generating coil unit 111c, the second core element 160a of the first generating coil unit 111a is placed in contact with the first core element 150b of the second generating coil unit 111b, and the second core element 160b of the second generating coil unit 111b is placed in contact with the first core element 150c of the third generating coil unit 111c. The magnetic poles of each core element extend into spaces between the magnetic poles of the opposite core element. As seen from the drawings, the first, second and third generating coil units are assembled such that the magnetic poles 151a of the first core element 150a of the first generating coil unit 111a, the magnetic poles 151b of the first core element 150b of the second generating coil unit 111b and the magnetic poles 151c of the first core element 150c of the third generating coil unit 111c are in circumferentially corresponding positions. Consequently, the magnetic poles 161a of the second core element 160a of the first generating coil unit 111a, the magnetic poles 161b of the second core element 160b of the second generating coil unit 111b and the magnetic poles 161c of the second core element 160c of the third generating coil unit 111c are in circumferentially corresponding positions.

Figure 12A:
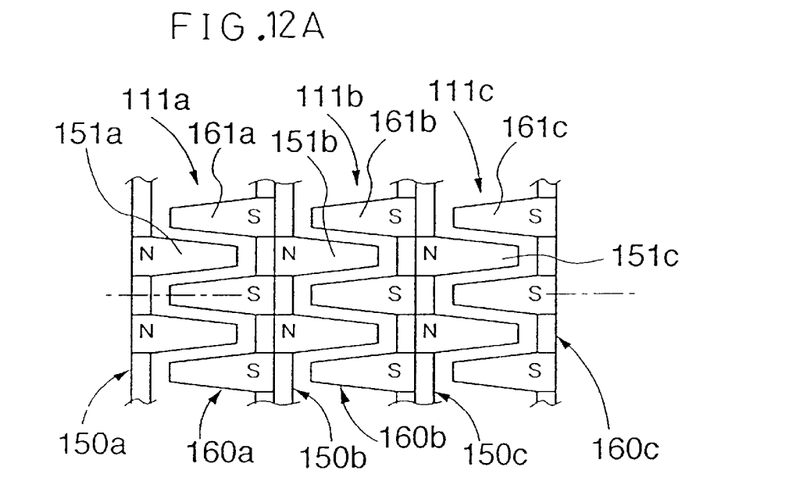
FIG. 12A is an explanatory view showing an arrangement of first and second core elements and polarities occurring with first magnetic poles in a conventional generator.
Figure 12B:
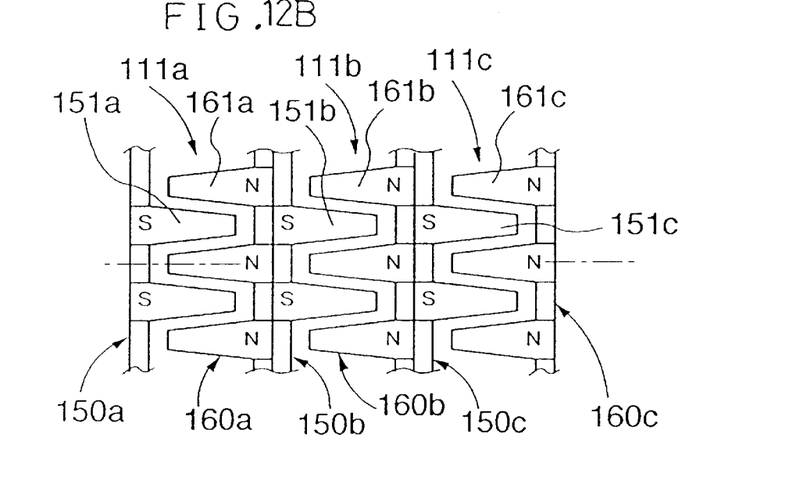
FIG. 12B is an explanatory view showing the arrangement of the first and second core elements and polarities occurring with the first magnetic poles elements in the conventional generator.

With the generator having the above construction, when the hub body is rotated to rotate the magnet assembly around the generating coil units, the two states shown in FIGS. 12A and 12B are alternated repeatedly. That is, in the state shown in FIG. 12A, the magnetic poles 151a–151c of the first core elements of all of the first, second and third generating coil units 111a–111c are north poles, and the magnetic poles 161a–161c of the second core elements are south poles. In the state shown in FIG. 12B, the magnetic poles 151a–151c of the first core elements of all of the first, second and third generating coil units 111a–111c, are south poles, and the magnetic poles 161a–161c of the second core elements are north poles. Between an adjacent pair of generating coil units, north poles and south poles contact each other. An interference occurs between the contacting core elements, so that the magnetic flux supplied from the magnet assembly leaks from the generating coils. As a result, part of the generating coil units fails to generate power, or only a low output is provided, even if power is generated, compared with a flux density provided by the magnet assembly.

SUMMARY OF THE INVENTION

A primary object of the present invention is to provide a bicycle generator-containing containing hub which is compact in construction and yet is capable of high output power generation.

Another object of the invention is to provide a lighting apparatus for a bicycle, using this generator-containing hub, which has excellent durability in lighting.

The above object is fulfilled, according to the present invention, by a bicycle generator-containing hub in which an adjacent pair of the generating coil units are arranged to have the second core element of one generating coil unit in contact with the first core element of the other, such that the magnetic poles of the first core element of the one generating coil unit and the magnetic poles of the second core element of the other generating coil unit are in corresponding positions circumferentially of the hub spindle, and that the magnetic poles of the second core element of the one generating coil unit and the magnetic poles of the first core element of the other generating coil unit are in corresponding positions circumferentially of the hub spindle.

When the magnet assembly of the generator rotates, a first state and a second state are produced alternately. That is, in the first state, the magnetic poles of the first core element of one generating coil unit and the magnetic poles of the second core element of the other adjacent generating coil unit become north poles, while the magnetic poles of the second core element of the one generating coil unit and the magnetic poles of the first core element of the other generating coil unit become south poles. In the second state, the magnetic poles of the first core element of the one generating coil unit and the magnetic poles of the second core element of the other generating coil unit become south poles, while the magnetic poles of the second core element of the one generating coil unit and the magnetic poles of the first core element of the other generating coil unit become north poles. In the arrangement of magnetic poles according to the present invention as noted above, the second core element of a first generating coil unit is placed in contact with the first core element of a second generating coil unit adjacent the first generating coil unit. Therefore, magnetic fields of the same polarity are formed with the magnetic poles of the core elements contacting each other, whether in the first state or in the second state. Magnetic flux passes through the generating coils to generate electric current, without leaking between magnetic poles interfering with one another as in the prior art Since no leakage of magnetic flux occurs between the magnetic poles of the core elements contacting each other, the magnetic flux supplied to the magnetic poles of each of the plurality of generating coil units contributes to power generation without being wasted. Consequently, all of the generating coil units generate power efficiently.

Further, with the above construction, a direction of flux density in one of the adjacent pair of generating coil units is opposite to that in the other generating coil unit. Thus, where the generating coils of the pair of generating coil units are wound in the same direction, the current flows in opposite directions through the generating coils of the two generating coil units. Where the generating coils of the pair of generating coil units are wound in opposite directions, the current flows in the same direction through the generating coils of the two generating coil units. However, whether the plurality of generating coil units are connected to a power takeout in series to one another, i.e. the series coil type, or the plurality of generating coil units are connected to a power takeout in parallel to one another, i.e. the parallel coil type, the connecting mode and the direction of current flow through the generating coil of each generating coil unit are taken into account. Ends of the generating coils of the generating coil units are connected so that the current flows in the same direction through the circuit formed by connecting the plurality of generating coils. In this way, power may be taken out without any trouble due to the opposite directions of flux density in the two adjacent generating coil units. Consequently, even when the bicycle runs at low speed, flux density is utilized without waste to realize high-output power for the rotating rate of the hub.

In a lighting apparatus for a bicycle having a headlamp for receiving power from the above bicycle generator-containing hub, the present invention proposes provision of a voltage regulator for controlling a voltage applied to the headlamp to be below a predetermined voltage. This predetermined voltage is a maximum voltage at which the lamp is free from burnout. When running downhill to rotate the hub body at high speed, for example, the generator-containing hub may supply power at a higher voltage than the predetermined voltage. However, the voltage regulator applies the predetermined voltage or a lower voltage to the lamp, thereby reducing the chance of burnout. Since power is supplied from the high-output generator-containing hub according to the present invention, power is supplied in a greatly increased output during a high-speed run such as a downhill run. In this case also, the voltage regulator is operable to check a burnout The features and advantages of various embodiments of the present invention will be set forth hereinafter.

The construction defined in claim 2 provides an advantage in wiring whether the generating coils are connected in series or in parallel. That is, even if an adjacent pair of generating coil units have flux density in opposite directions, one end of one generating coil and the same end of the other generating coil have opposite polarities where the generating coils are wound in the same direction. For example, if the left end, axially of the hub spindle, of the generating coil of one generating coil unit is plus, the left end of the generating coil of the other generating coil unit is minus. Thus, wires extending from the coils tend to be in a complicated condition whether the coils are connected in series or in parallel. By contrast, where the generating coils of an adjacent pair of generating coil units are wound in opposite directions, the same-lateral ends of all the generating coils have the same polarity. For example, if the left end, axially of the hub spindle, of the generating coil of one generating coil unit is plus, the left end of the generating coil of the other generating coil unit is also plus. Then, the series mode is provided by interconnecting adjacent lateral ends of adjacent generating coils. The parallel mode is provided by interconnecting the same lateral ends of all generating coils. Thus, the coils may be connected in the series mode or parallel mode with a reduced complication of wires extending from the coils. In realizing the adjacent generating coils wound in opposite directions, the generating coil units are manufactured to have all the generating coils wound in the same direction. When the generating coil units are assembled to complete the generator, one of an adjacent pair of generating coil units is reversed from the direction in which that one generating coil unit faces in time of manufacture. Then, the left end, as at manufacture, of one generating coil unit contacts the right end, as at manufacture, of the other generating coil unit, which results in the opposite winding directions. That is, in time of manufacturing the generating coil units, only one type having generating coils wound in the same direction may be manufactured instead of two types having generating coils wound in opposite directions. Yet the completed generator has generating coils wound in opposite directions. This contributes to a reduction in manufacturing cost.

With the construction defined in claim 3, when the plastic connecting element is filled and formed between the generating coil units and the hub spindle, part of the generating coil units may be spaced to a greater or less extent than the other from the hub spindle due to a manufacturing error or the like as long as the generating coil units are precisely arranged coaxially. All of the generating coil units in a precisely coaxial arrangement are connected to the hub spindle, accommodating the spacing error. This enhances reliability in quality of the generator.

The construction defined in claim 4 allows all of the generating-coil units to generate power as desired while reducing the number of magnets for the number of generating coil units. This construction not only simplifies assembly of the magnets but achieves compactness.

The construction defined in claim 5 allows the generating coils to be in thin winding, compared with the case of connecting the generating coils in series. Even so, power of a desired voltage is generated while the resistance produced by the generating coils is reduced or remains the same.

In the construction defined in claim 6, three generating coils are arranged in parallel. This construction supplies power of a desired voltage while diminishing the resistance of the coils for the diameter of the winding.

The construction defined in claim 7 diminishes the length of the group of generating coil units axially of the hub spindle, to contribute to compactness of the generator.

In the construction defined in claim 9, the illuminance requiring lighting is established as the first set lux, and the illuminance, for example, 10 lux lighter than the first set lux is established as the second set lux. Under these conditions, a light control system, with the illuminance detector and light controlled, automatically controls the lamp, whereby the lamp is automatically turned off in a light condition such as during the day, and automatically turned on in a dark condition such as at night. The illuminance detector may detect an illuminance level above the first set lux when the bicycle with the lamp turned on passes near a street lamp or the like. The light controller keeps on the lamp if the detected illuminance is less than the second set lux. This feature provides an advantage of allowing the bicycle to run along street lamps without the trouble of the lamp blinking near each street lamp.

Other features and advantages of the present invention will be apparent from the following description of the embodiments of the invention taken with reference to the accompanying drawings.

DETAILED DESCRIPTION OF THE PREFERRED EMBODIMENTS

Figure 1:
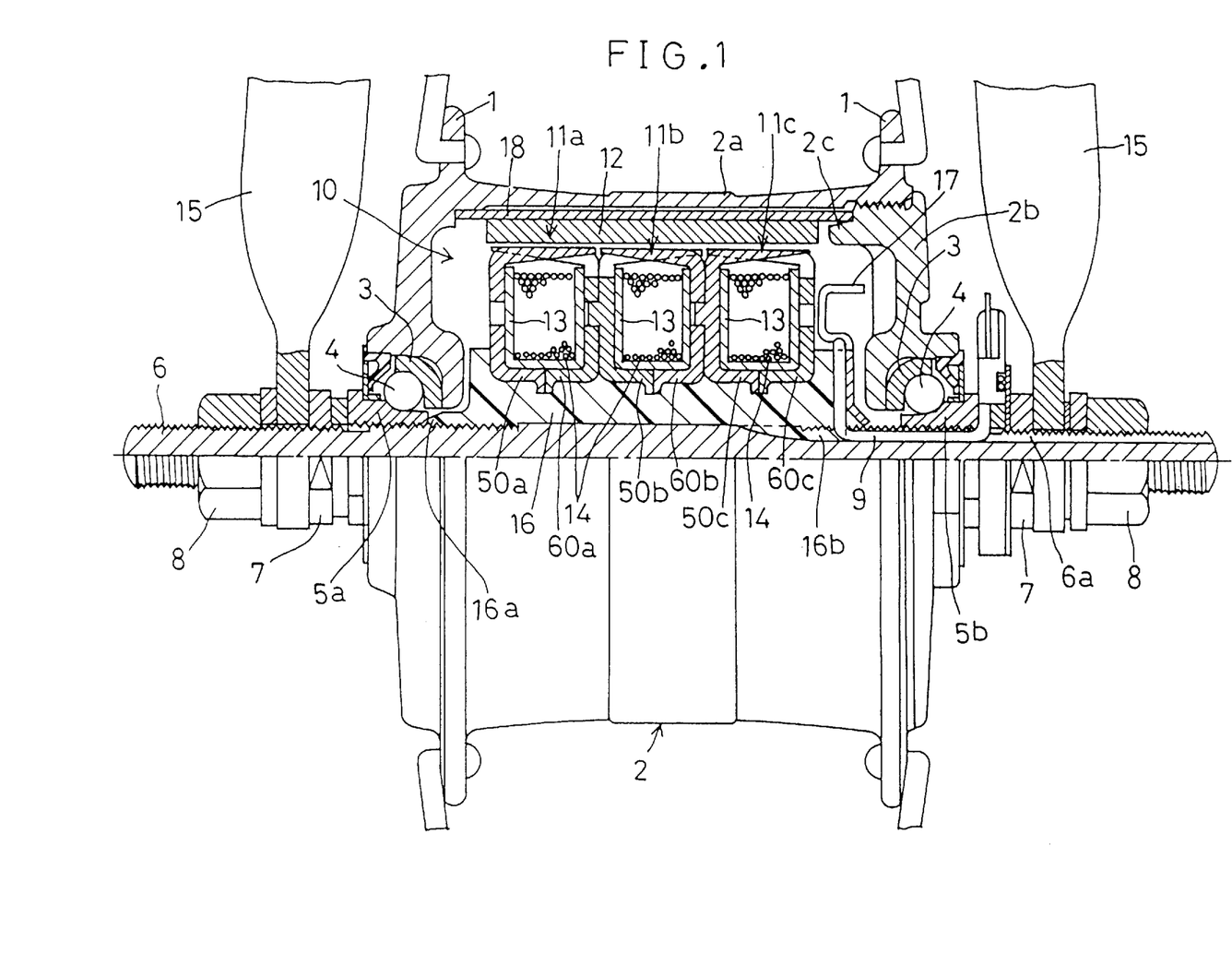
FIG. 1 is a sectional view of a bicycle front wheel hub containing a generator according to the present invention.

Referring to FIG. 1, a bicycle generator-containing hub 2 includes a hub body 2a having a pair of right and left hub flanges 1, and a hub cap 2b attached to one end of the hub body 2a. The hub 2 is rotatably mounted on a hub spindle 6 through a pair of right and left ball receivers 3, balls 4 and ball pressers 5a and 5b. A generator 10 is mounted inside the hub 2. This generator-containing hub 2 is a front wheel hub. The hub spindle 6 is fixed tight to tip ends of a front fork 15 by a pair of right and left lock nuts 7 and mounting nuts 8 disposed outwardly of the ball pressers 5a and 5b or the hub spindle 6. The generator 10 is driven by rotation of the hub 2 to generate electric power. The power generated is supplied to a headlamp and a light control apparatus, which will be described in detail later, by an electric cord 9 extending from inside to outside of the hub 2 through a cord takeout groove 6a formed adjacent one end of the hub spindle 6.

As shown in FIG. 1, the generator 10 includes three generating coil units, i.e. a first generating coil unit 11a, a second generating coil unit 11b and a third generating coil unit 11c, arranged coaxially with and along the axis of the hub spindle 6, and a cylindrical magnet assembly 12 surrounding the generating coil units 11a–11c and coaxial with the hub spindle 6.

Figure 2A:
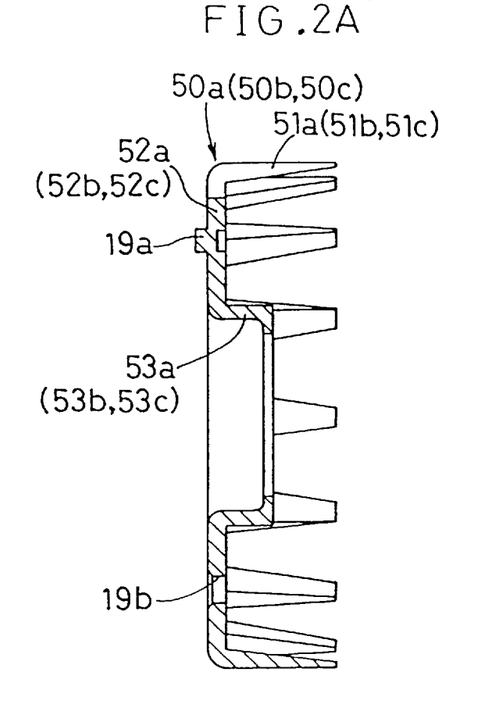
FIG. 2A is a sectional view of a first core element.
Figure 2B:
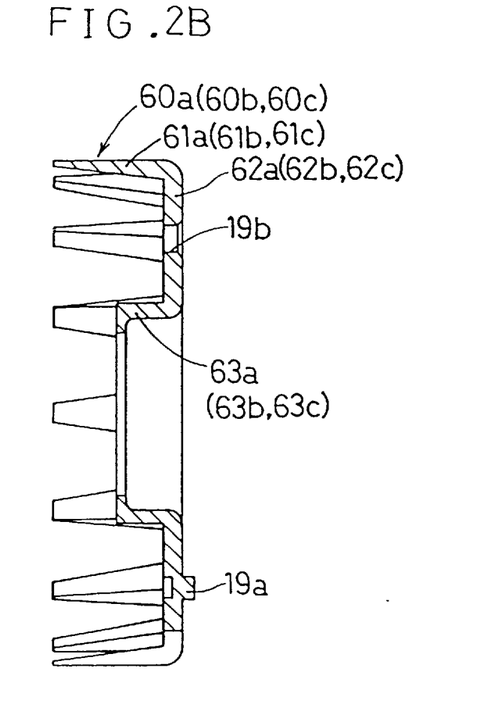
FIG. 2B is a sectional view of a second core element.

The first generating coil unit 11a includes a first ring-shaped core element 50a as shown in FIG. 2A, and a second ring-shaped core element 60a as shown in FIG. 2B. The coil unit 11a further includes a generating coil 14 wound around a plastic bobbin 13 disposed in an annular space defined by a combination of the two core elements 50a and 60a. The first core element 50a is formed of malleable iron, and includes a ring wall 52a, 16 magnetic poles 51a projecting axially and substantially parallel to one another in equidistant arrangement from outer peripheral positions of the ring wall 52a, and a boss 53a connected to an inner periphery of the ring wall 52a. The second core element 60a has the same shape as the first core element 50a, and also includes 16 magnetic poles 61a, a ring wall 62a and a boss 63a.

The second generating coil unit 11b and third generating coil unit 11c are identical to the first generating coil unit 11a, and each include a first core element 50b or 50c, a second core element 60b or 60c, and a generating coil 14 wound around a plastic bobbin 13. Similarly, the first core element includes 16 magnetic poles 51b or 51c, a ring wall 52b or 52c and a boss 53b or 53c. The second core element also includes 16 magnetic poles 61b or 61c, a ring wall 62b or 62c and a boss 63b or 63c.

Figure 3:
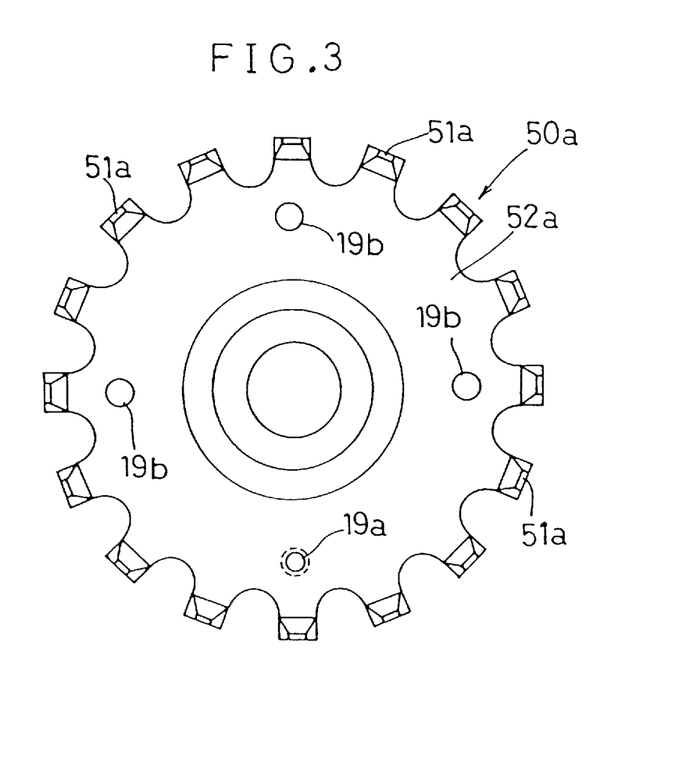
FIG. 3 is a side view of the first (second) core element.

A side view of each core element is shown in FIG. 3.

The three generating coil units 11a–11c are arranged around the hub spindle 6 to have a minimal length axially thereof. Specifically, the second core element 60a of the first generating coil unit 11a is in contact with the first core element 50b of second generating coil unit 11b. Similarly, the second core element 60b of the second generating coil unit 11b is in contact with the first core element 50c of the third generating coil unit 11c. The first, second and third generating coil units 11a–11c are rigidly connected to the hub spindle 6 by a plastic connecting element 16 filled between the coil units 11a–11c and hub spindle 6. Consequently, the first, second and third generating coil units 11a–11c are supported not to be displaceable anally or circumferentially of the hub spindle 6.

Figure 4A:
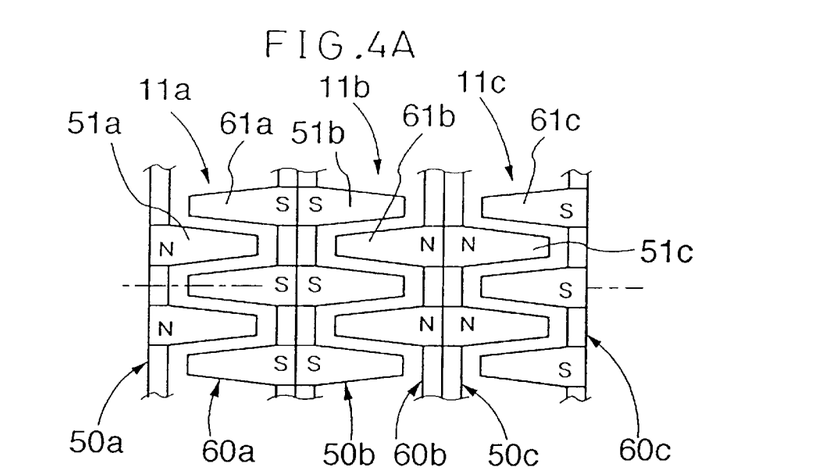
FIG. 4A is an explanatory view showing an arrangement of the first and second core elements and polarities occurring with first magnetic poles.
Figure 4B:
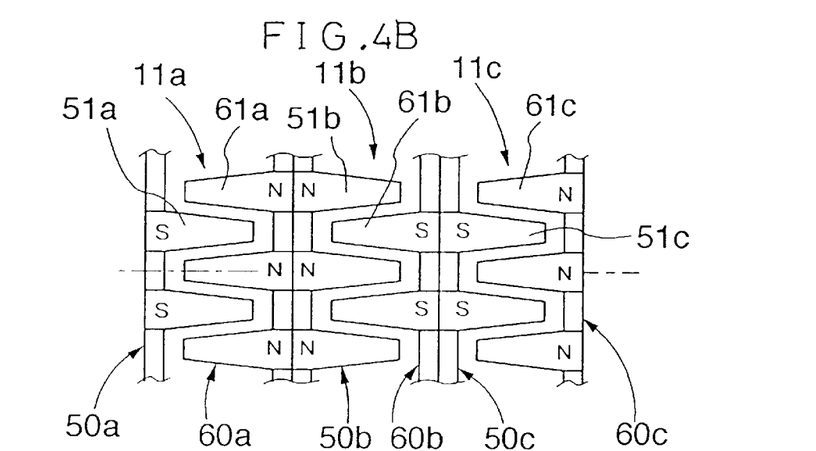
FIG. 4B is an explanatory view showing the arrangement of the first and second core elements and polarities occurring with the first magnetic poles.

The first, second and third generating coil units 11a–11c are assembled so that the magnetic poles 51a, 51b and 51c of the first core elements and the magnetic poles 61a, 61b and 61c of the second core elements are arranged as shown in FIGS. 4A and 4B. Specifically, the magnetic poles 51a of the first Core element 50a of the first generating coil unit 11a, the magnetic poles 61b of the second core element 60b of the second generating coil unit 11b, and the magnetic poles 51c of the first core element 50c of the third generating coil unit 11c are aligned to one another in the axial direction of the hub spindle 6, i.e. arranged in corresponding positions circumferentially of the generating coils 14. The magnetic poles 61a of the second core element 60a of the first generating coil unit 11, the magnetic poles 51b of the first core element 50b of the second generating coil unit 11b, and the magnetic poles 61c of the second core element 60c of the third generating coil unit 11c realigned to one another in the axial direction of the hub spindle 6, i e. arranged in corresponding positions circumferentially of the generating coils 14.

That is, the magnetic poles 61a of the first generating coil unit 11a and the magnetic poles 51b of the second generating coil unit 11b contact each other as a result of the contact between the core elements of the first generating coil unit 11a and second generating coil unit 11b. Consequently, the magnetic poles 61a and 51b always have the same polarity. When the magnetic poles 61a are north poles, the magnetic poles 51b become north poles. When the magnetic poles 61a are south poles, the magnetic poles 51b become south poles. The magnetic poles 61b of the second generating coil unit 11b and the magnetic poles 51c of the third generating coil unit 11c contact each other as a result of the contact between the core elements of the second generating coil unit 11b and third generating coil unit 11c. Consequently, the magnetic poles 61b and 51c always have the same polarity. When the magnetic poles 61b are north poles, the magnetic poles 51c become north poles. When the magnetic poles 61b are south poles, the magnetic poles 51c become south poles.

The magnetic poles arranged in circumferentially corresponding position., may be slightly displaced from precisely the same positions circumferentially of the generating coils 14. Such displacement is permissible as long as the magnetic poles receive magnetic flux from the magnet assembly 12 to generate power properly. Such an arrangement is included in the scope of the present invention. That is, the term circumferentially corresponding positions used herein has a certain permissible range.

Figure 5:
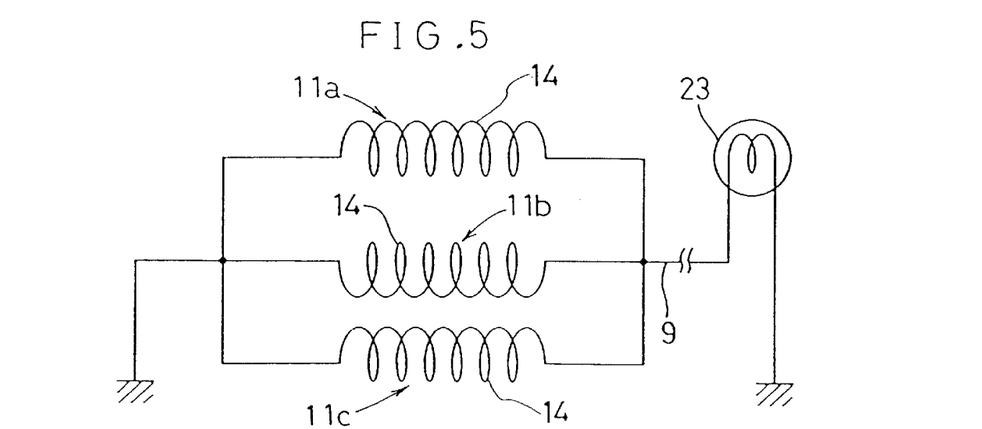
FIG. 5 is an explanatory view of a connection of generating coils.

As schematically shown in FIG. 5, the generating coils 14 of the three generating coil units 11a–11c are connected in parallel to one another to the electric cord 9 acting as a power takeout The generating coils 14 of the first and third generating coil units 11a and 11c are wound in the same direction, and the generating coil 14 of the second generating coil unit 11b disposed in the middle is wound in the opposite direction thereto. Thus, an adjacent pair 11a and 11b or 11b and 11c of the three generating coil units 11a–11c have opposite generating coil winding directions. With this arrangement, the generating coils 14 present a less resistance, for a voltage available for takeout, than where the three generating coils 14 are connected in series. Moreover, although the second generating coil unit 11b disposed in the middle has a direction of flux density opposite to the first and third generating coil units 11a and 11c disposed at, opposite ends, the same lateral ends of all of the generating coils 14 have the same polarity such that, for example, when the same lateral ends, facing one end of the hub spindle 6, of the generating coils 14 arranged at the opposite ends are plus, the corresponding end of the generating coil 14 in the middle is also plus. Compared with all of the generating coils 14 having the same winding direction, this arrangement involves a less complication of leads extending from the generating coils 14 to connect the generating coils 14 to the electric cord 9, which serves as a power takeout and to a ground terminal 17 contacting the hub spindle 6.

Figure 6:
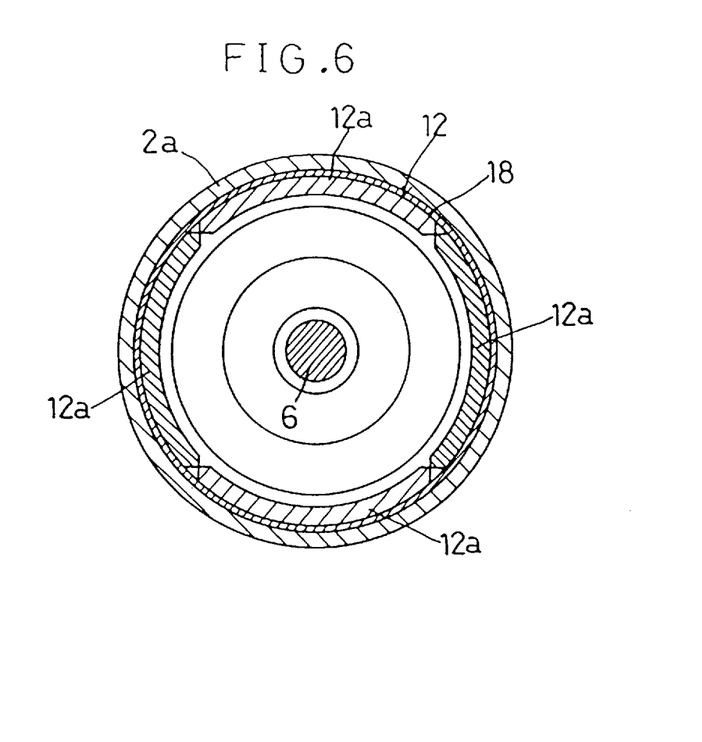
FIG. 6 is a sectional view of a magnet assembly.
Figure 7:
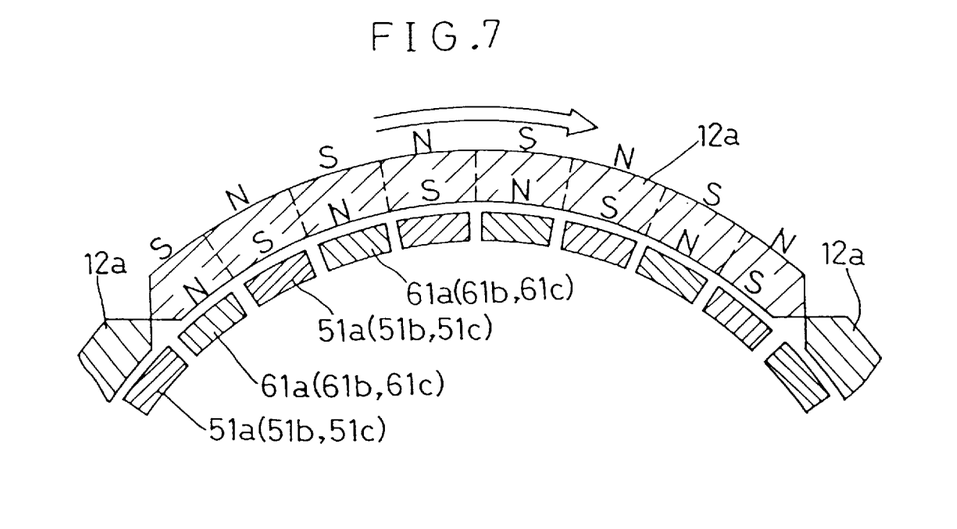
FIG. 7 is an explanatory view showing an arrangement of polarities in the magnet assembly.

The cylindrical magnet assembly 12 includes four arcuate magnets 12a as shown in FIG. 6. As shown in FIG. 1, these magnets 12a are arranged circumferentially of the hub 2, and inside a cylindrical back yoke 18 formed of malleable iron and disposed coaxially with the hub spindle 6. The cylindrical magnet assembly 12 is fixed, along with the back yoke 18, to the hub body 2a by pressing action of the hub cap 2b upon the hub body 2a and engaging action of engaging portions 2c of the hub cap 2b. As shown in FIG. 7, each of the four magnets 12a defines four north poles and four south poles arranged alternately, cicumferentially of the hub, and at the same intervals as the magnetic poles 51a and 61a (51b and 61b; 51c and 61c). Each of the four magnets 12a has a length in the axial direction of the hub spindle 6 substantially corresponding to the length of the group of the three generating coil units 11a–11c in the axial direction of the hub spindle 6. Thus, the cylindrical magnet assembly 12 has a length substantially corresponding to the length of the group of generating coils in the axial direction of the hub spindle 6, and magnetic poles corresponding in number to and arranged at the same intervals; circumferentially of the generating coils 14 as the 32 magnetic poles of the generating coil units 11a–11c. The magnet assembly 12 is rotatable with and at the same rate as the hub 2 to supply magnetic flux to each of the generating coil units 11a–11c.

Specifically, with rotation of the hub 2, the cylindrical magnet assembly 12 rotates circumferentially of the three generating coil units 11a–11c. The magnetic poles of the magnet assembly 12 arranged circumferentially of the hub 2 are successively opposed to the magnetic poles of the first and second core elements, of the three generating coil units 11a–11c, respectively. Then, a first state is produced as shown in FIG. 4A in which the magnetic poles 51a of the first core element 50a of the first generating coil unit 11a, the magnetic poles 51c of the first core element 50c of the third generating coil unit 11c, and the magnetic poles 61b of the second core element 60b of the second generating coil unit 11b become north poles, while the magnetic poles 61a of the second core element 60a of the first generating coil unit 11a, the magnetic poles 61c of the second core element 60c of the third generating coil unit 11c, and the magnetic poles 51b of the first core element 50b of the second generating coil unit 11b become south poles. Next, a second state is produced as shown in FIG. 4B in which the magnetic poles 51a of the first core element 50a of the first generating coil unit 11a, the magnetic poles 51c of the first core element 50c of the third generating coil unit 11c, and the magnetic poles 61b of the second core element 60b of the second generating coil unit 11b become south poles, while the magnetic poles 61a of the second core element 60a of the first generating coil unit 11a, the magnetic poles 61c of the second core element 60c of the third generating coil unit 11c, and the magnetic poles 51b of the first core element 50b of the second generating coil unit 11b become north poles. Consequently, in each of the three generating coil units 11a–11c, a reversal is made repeatedly between a state of magnetic flux being directed from the first core element to the second core element and a state of magnetic flux being directed from the second core element to the first core element, whereby a current is produced in the generating coil 14. At this time, as shown in FIGS. 4A and 4B, the core elements contacting each other have the same polarity, between the first and second generating coil units 11a and 11b and between the second and third generating coil units 11b and 11c. Thus, the magnetic flux supplied from the magnet assembly 12 to each of the three generating coil units 11a–11c passes through the generating coil 14 of the generating coil unit 11a, 11b or 11c reliably without leaking from the generating coil 14 between the core elements contacting each other. All of the generating coil units 11a–11c reliably generate power corresponding to the flux density supplied from the magnet assembly 12 to the generating coil units 11a–11c.

As shown in FIG. 1, the plastic connecting element 16 includes a contact portion 16a at one end thereof for contacting an end of the ball presser 5a to position the ball presser 5a relative to the hub spindle 6. The generator-containing hub is assembled by screwing the ball presser 5a inward relative to the hub spindle 6 until the ball presser 5a contacts the contact portion 16a, and thereafter screwing the other ball presser 5b inward relative to the hub spindle 6. Thus, the hub 2 is locked against displacement in the axial direction of the hub spindle 6 by the right and left ball pressers 5a and 5b through the ball receivers 3 and balls 4. That is, the contact portion 16a acts as a reference for positioning the generating coils 14 and magnet assembly 12 in the axial direction of the hub spindle 6. Thus, although the generator 10 is mounted inside the hub 2 to be invisible to the outside, the plastic connecting element 16 for fixing the generating coil units 11a–11c to the hub spindle 6 is effectively utilized as a positioning device to fix the generating coil units 11a–11c and magnet assembly 12 to predetermined positions in the axial direction of the hub spindle 6. This construction is assembled with ease to generate power reliably as desired.

As shown in FIG. 1, the plastic connecting element 16 includes an engaging portion 16b at the other end thereof extending into an end region of the cord takeout groove 6a for locking the hub spindle 6 against rotation. Thus, the plastic connecting element 16 is used to prevent rotation of the hub spindle 6. That is, the plastic connecting element 16 not only adheres to the hub spindle 6, but effectively utilizes the cord takeout groove 6a as a rotation stopper to lock the hub spindle 6 against rotation. Even when the adhesion to the hub spindle 6 of the plastic connecting element 16 becomes weak, the generating coil units 11a–11c are reliably fixed to the hub spindle 6 to generate power as desired.

Next, a lighting apparatus for a bicycle using the bicycle generator-containing hub according to the present invention will be described with reference to FIGS. 8 through 10.

This lighting apparatus includes a headlamp 20 and a light control system 30. As shown in FIGS. 8 and 9, the headlamp 20 includes a main lamp 23 and a spare lamp 24 attached to a front portion of an apparatus case 21 through a lamp holder 22, a reflector 25 and a transparent lamp cover 26. The light control system 30 is mounted in a rear region of the apparatus case 21. The main lamp 23 receives power from the generator 10 as described in detail with reference to a circuit diagram later.

The headlamp 20 is attached to the front fork 15 by a mounting arm 27 extending from the apparatus case 21, and a mounting screw 28 for fastening the mounting arm 27 to the front fork 15.

Figure 10:
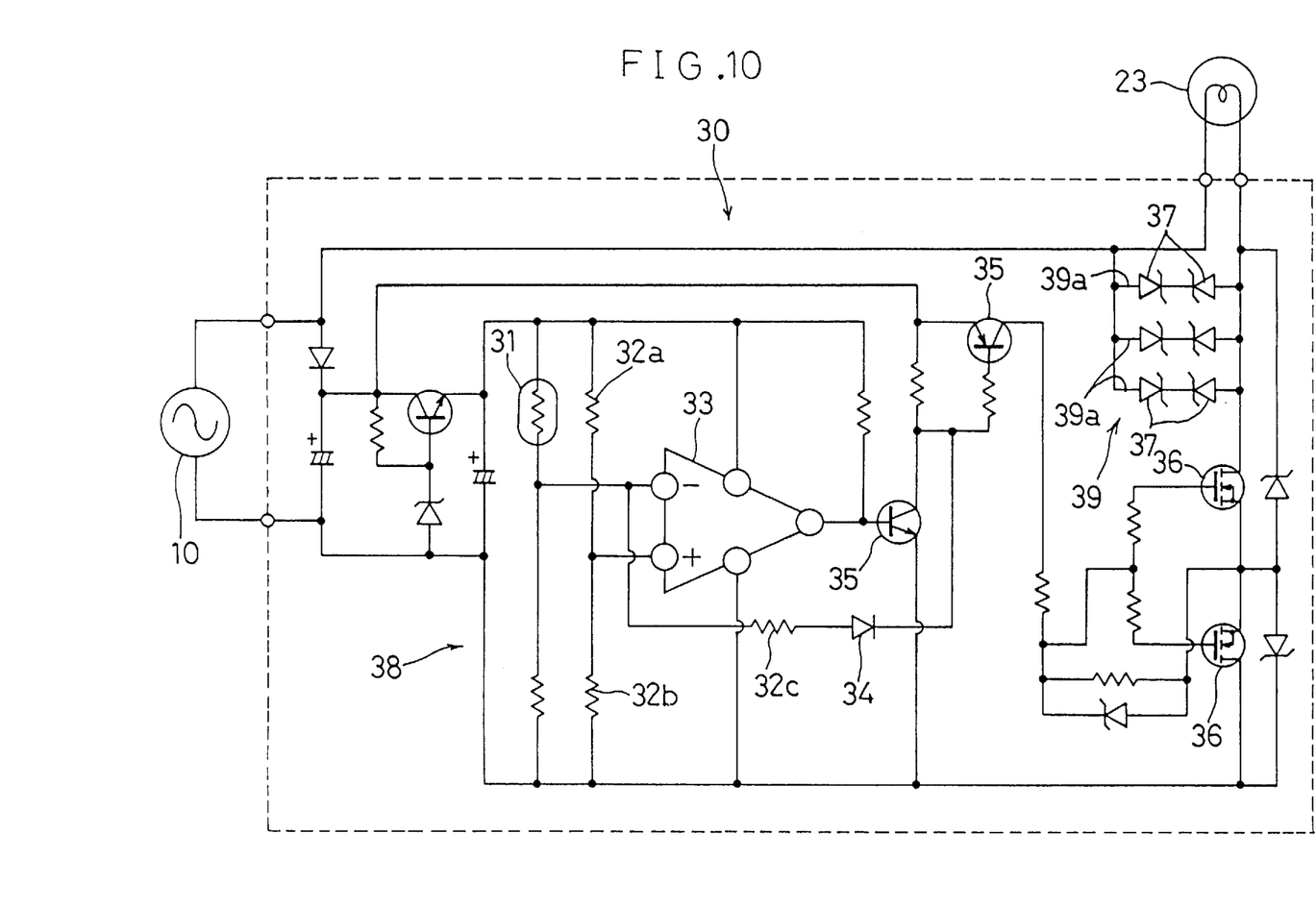
FIG. 10 is an electric circuit diagram.

As shown in FIG. 10, the light control system 30 comprises an electric circuitry including a CdS 31 acting as an illuminance detector having a resistance variable with an intensity of light, resistors 32a, 32b and 32c, a hysteresis comparator 33, a diode 34, a transistor 35, a transistor 36 and a plurality of Zener diodes 37. This circuitry has a function of a light controller 38 including the illuminance detector (CdS) 31, resistors 32a–32c, hysteresis comparator 33, diode 34, transistor 35 and transistor 36, and a function of a voltage regulator 39 including the plurality of Zener diodes 37. As will be apparent from the following description, the circuitry automatically turns the main lamp 23 on and off, and prevents burnout of the main lamp 23.

Figure 8:
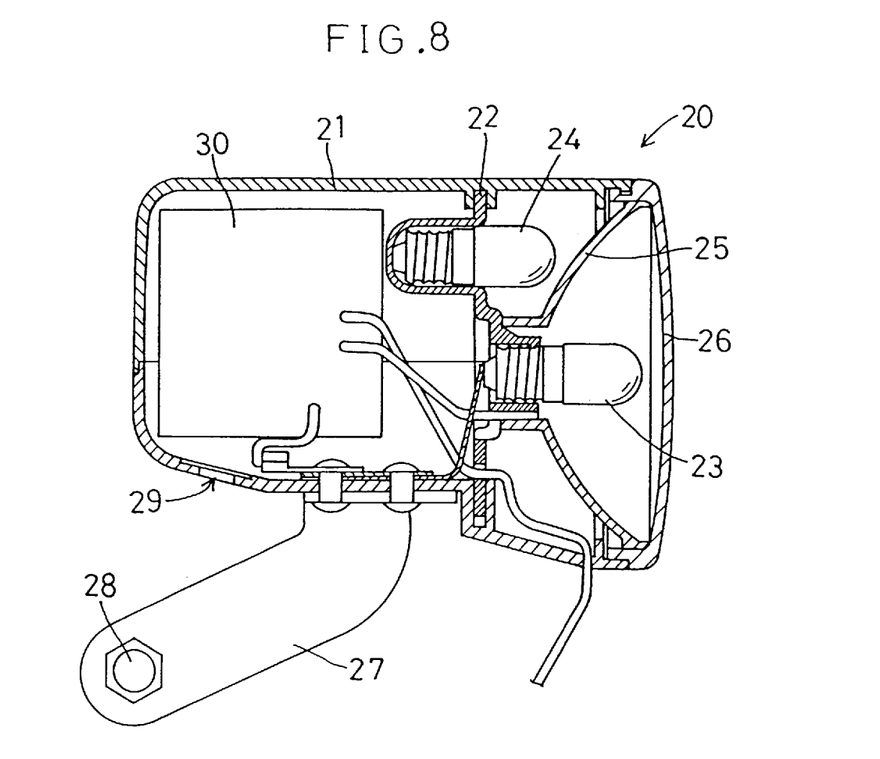
FIG. 8 is a sectional view of a headlamp.
Figure 9:
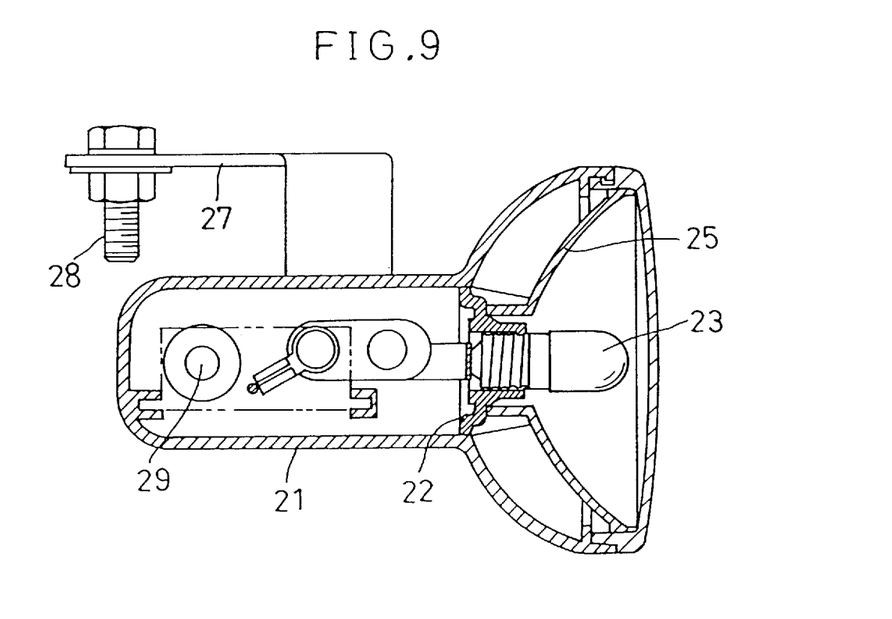
FIG. 9 is a sectional view of the headlamp.

The illuminance detector 31 receives ambient light through a light window 29 in the apparatus case 21 shown in FIGS. 8 and 9. The illuminance detector 31 detects ambient illuminance based on variations in electric resistance occurring with variations in quantity of light received. The illuminance detector 31 outputs an electric signal to the light controller 38, indicating detected illuminance in lux.

Figure 11:
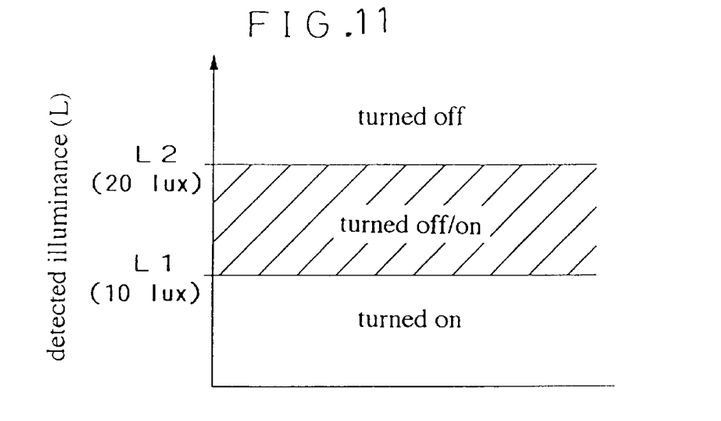
FIG. 11 is an explanatory view of a hysteresis control for the head light.

The light controller 38, by action of resistors 32a–32c and diode 347 establishes a first set lux L1 as a turn-on illuminance, and a second set lux L2 lighter than the first set lux L1 as a turn-off illuminance. The hysteresis comparator 33 compares illuminance L detected by the illuminance detector 31, with the first set lux L1 and second set lux L2, to determine whether the detected illuminance L is less than the first set lux L1 or greater than the second set lux L2. When the detected illuminance L is less than the first set lux L1, a circuit portion including the diode 35 automatically switches the diode 36 to a turn-n position, whereby the diode 36 turns on the main lamp 23. When the detected illuminance L is greater than the second set lux L2, the circuit portion including the diode 35 automatically switches the diode 36 to a turn-off position, whereby the diode 36 turns off the main lamp 23. The hysteresis comparator 33, by action of a circuit portion including the resistor 32c and diode 34, causes the diode 36 with a hysteresis to effect switching operations when, as shown in FIG. 11, the detected illuminance L is between the first set lux L1 and second set lux L2. Thus, after the illuminance detected by the illuminance detector 31 exceeds the second set lux L2, the diode 36 remains in the turn-off position even though the detected illuminance L becomes less than the second set lux L2. The diode 36 is switched to the turn-on position only when the detected illuminance L falls below the first set lux L1. After the illuminance detected by the illuminance detector 31 falls below the first set lux L1, the diode 36 remains in the turn-on position even though the detected illuminance L becomes higher than the first set lux L1. The diode 36 is switched to the turnoff position only when the detected illuminance L exceeds the second set lux L2. The first set lux L1 and second set lux L2 may be determined according to illuminance conditions of running courses or with reference to lighting criteria As a specific example, the first set lux L1 is about 10 lux and the second set lux L2 about 20 lux, in view of an illuminance level at which lighting is desired, and an illuminance level at which a driving load due to the resistance of the generator is felt to be relatively large if the lamp is kept on.

Thus, when the illuminance detector 31 detects an illuminance level below about 10 lux during a night run, for example, the light controller 38 automatically responds to the detected illuminance and turns on the lamp 23. When the illuminance detector 31 detects an illuminance level above about 20 lux during a daytime run, the light controller 38 automatically responds to the detected illuminance and turns off the lamp 23. The rider need not take the trouble of turning the headlamp 20 on and off; the rider may ride the bicycle with the headlamp 20 turned on when necessary, and turned off when unnecessary to be free of the driving load of the generator 10. Even when passing through a relatively light place, such as near a street lamp, the main lamp 23 is kept on instead of blinking unless the illuminance level reaches 20 lux.

As shown in FIG. 10, the voltage regulator 39 includes a plurality of voltage regulating circuits 39a connected to the main lamp 23 in parallel to one another. Each regulating circuit 39a includes a pair of Zener diodes 37 interconnected in an opposed relationship to act on alternating current. The current supplied from the generator 10 is applied to each of the voltage regulating circuits 39a. Thus, the voltage regulator 39 controls the voltage supplied from the generator 10 to the lamp 23 to be below a predetermined voltage. The predetermined voltage is a voltage which does not readily burn out the lamp 23. With this construction, even when the generator 10 is driven at a high rotating rate to supply high-voltage power, the lamp 23 may emit light while avoiding a burnout. Even when the lamp bums out and the current from the generator 10 flows only to the voltage regulator 39, the current is distributed to the plurality of voltage regulating circuits 39a. Only a small amount of current flows to the Zener diodes 37 of each regulating circuit 39a. Thus, the Zener diodes 37 are protected from damage in the event of a burnout of the lamp 23. The voltage regulator 39 is highly reliable in preventing a burnout after the lamp is changed also.

The group of generating coil units according to the present invention is, manufactured by the following method.

Each generating coil unit 11a, 11b or 11c is manufactured by assembling, as shown in FIGS. 1, 4A and 4B, the generating coil 14 wound around the bobbin 13, with the first core element 50a, 50b or 50c and the second core element 60a, 60b or 60c formed to have the same configuration as shown in FIGS. 2A, 2B and 3. That is, the first generating coil unit 11a is assembled so that the 16 magnetic poles 51a arranged equidistantly and circumferentially of the first core element 50a and the 16 magnetic poles 61a arranged equidistantly and circumferentially of the second core element 60a extend toward each other to a mutually overlapping extent. For the second and third generating coil units, the first and second core elements are likewise assembled together. Next, the first, second and third generating coil units 11a–11c are combined together axially of the hub spindle 6, such that the second core element 60a of the first generating coil unit 11a is in contact with the first core element 50b of second generating coil unit 11b, and the second core element 60b of the second generating coil unit 11b is in contact with the first core element 50c of the third generating coil unit 11c. In this state, the magnetic poles 61a of the second core element 60a of the first generating coil unit 11a, the magnetic poles 51b of the first core element 50b of the second generating coil unit 11b, and the magnetic poles 61c of the second core element 60c of the third generating coil unit 11c are substantially aligned to one another axially of the hub spindle 6. The magnetic poles 51a of the first core element 50a of the first generating coil unit 11a, the magnetic poles 61b of the second core element 60b of the second generating coil unit 11b, and the magnetic poles 51c of the first core element 50c of the third generating coil unit 11c are aligned to one another axially of the hub spindle 6. A plastic-forming die (not shown) is placed between these generating coil units 11a–11c and the hub spindle 6 extending inside and coaxially therewith. A plastic material is filled into and allowed to harden in the die to form the plastic connecting element 16 shown in FIG. 1, thereby completing the group of generating coils. When assembling the three generating coil units 11a–11c, the generating coils 14 of all of the generating coil units 11a–11c are placed in the same winding direction. When interconnecting the three generating coil units 11a–11c with the plastic connecting element 16 to form the group of generating coils, the second generating coil unit 11b is placed so that its generating coil 14 has an opposite winding direction to the generating coils 14 of the first and third generating coil units 11a and 11c.

Thus, in time of manufacturing the generating coil units 11a–11c, only one type having the generating coils 14 wound in the same direction may be manufactured instead of two types having generating coils wound in opposite directions. When the plastic connecting element 16 is filled and formed between the generating coil units 11a–11c and the hub spindle 6, part of the generating coil units may be spaced to a greater or less extent than the other from the hub spindle 6 as long as the generating coil units 11a–11c are precisely arranged coaxially. All of the generating coil units 11a–11c in a precisely coaxial arrangement are connected to the hub spindle 6.

In FIGS. 2A, 2B and 3, the core elements 50 and 60 are shown to include projections 19a and perforations 19b which are provided for positioning the three generating coil units 11a–11c for assembly. That is, when assembling the three generating coil units 11a–11c, the projection 19a of one of an adjacent pair of core elements extends into one perforation 19b of the other core element. This engagement establishes the predetermined arrangement of the magnetic poles, described hereinbefore, between the adjacent pair of generating coil units 11a and 11b or 11b and 11c.

The constructions defined in claims 1–4 are applicable also to a bicycle generator-containing hub having a plurality of generating coils connected to the power takeout in series to one another.

The constructions defined in claims 1–7 are applicable also to a bicycle generator-containing hub having two, four or more generating coil units.

The Zener diodes 37 for regulating a voltage applied to the lamp may be replaced with low-current diodes, or with voltage regulating circuits having resistors and automatically switchable to a series connection to the lamp when the voltage from the generator exceeds a predetermined voltage. These devices are collectively called the voltage regulator 39 herein.

What is claimed is:

1. In a bicycle generator-containing hub having a hub spindle, a hub body rotatably mounted on the hub spindle, and a generator disposed inside the hub body, said generator comprising:
    a cylindrical magnet assembly (12) having north poles and south poles arranged alternately along an inner peripheral wall of said hub body; and
    a plurality of generating coil units (11a,11b,11c) arranged inside said cylindrical magnet assembly and positioned axially along said hub spindle, each of said generating coil units including:
        a first core element and a second core element opposed to each other and positioned axially along said hub spindle, wherein said first core element has magnetic poles arranged at intervals in peripheral positions thereof and extending toward said second core element, and said second core element has magnetic poles arranged at intervals in peripheral positions thereof and extending toward said first core element; and
        a generating coil disposed between said first and second core elements to be coaxial with said hub spindle;
    wherein an adjacent pair of said generating coil units are arranged to have said second core element of one generating coil unit in contact with said first core element of the other generating coil unit, such that said magnetic poles of said first core element of said one generating coil unit and said magnetic poles of said second core element of said other generating coil unit are in corresponding positions circumferentially of said hub spindle, and that said magnetic poles of said second core element of said one generating coil unit and said magnetic poles of said first core element of said other generating coil unit are in corresponding positions circumferentially of said hub spindle.

2. A bicycle generator-containing hub as defined in claim 1, wherein said generating coils of an adjacent pair of generating coil units are wound in opposite directions.

3. A bicycle generator-containing hub as defined in claim 1, wherein said generating coil units are rigidly connected to said hub spindle by a plastic connecting element filled and formed between said generating coil units and said hub spindle.

4. A bicycle generator-containing hub as defined in claim 1, wherein said magnet assembly extends in the axial direction of said hub spindle for supplying magnetic flux to all of said generating coil units.

5. A bicycle generator-containing hub as defined in claim 1, wherein said generating coils of said generating coil units are connected to a power takeout in parallel to one another.

6. A bicycle generator-containing hub as defined in claim 1, wherein said generator includes a first, a second and a third generating coil units arranged axially of said hub spindle, said second core element of said first generating coil unit being in contact with said first core element of said second generating coil unit, and said second core element of said second generating coil unit being in contact with said first core element of said third generating coil unit.

7. A bicycle generator-containing hub as defined in claim 1, wherein said first core element has spaces formed between adjacent ones of said magnetic poles, and wherein said magnetic poles of said second core element extend into said spaces between said magnetic poles of said first core element.

8. A lighting apparatus for a bicycle comprising:
a generator enclosed in a hub body rotatably mounted on a hub spindle, said generator including:
  a cylindrical magnet assembly having north poles and south poles arranged alternately along an inner peripheral wall of said hub body; and
  a plurality of generating coil units arranged inside said cylindrical magnet assembly and positioned axially along said hub spindle, each of said generating coil units including:
    a first core element and a second core element opposed to each other and positioned axially along said hub spindle, wherein said first core element has magnetic poles arranged at intervals in peripheral positions thereof and extending toward said second core element, and said second core element has magnetic poles arranged at intervals in peripheral positions thereof and extending toward said first core element; and
    a generating coil disposed between said first and second core elements to be coaxial with said hub spindle;
  wherein an adjacent pair of said generating coil units are arranged to have said second core element of one generating coil unit in contact with said first core element of the other generating coil unit, such that said magnetic poles of said first core element of said one generating coil unit and said magnetic poles of said second core element of said other generating coil unit are in corresponding positions circumferentially of said hub spindle, and that said magnetic poles of said second core element of said one generating coil unit and said magnetic poles of said first core element of said other generating coil unit are in corresponding positions circumferentially of said hub spindle;
a headlamp for receiving power from said generator; and
voltage regulating means for controlling a voltage applied to said headlamp to be below a predetermined voltage.

9. A lighting apparatus as defined in claim 8, further comprising light control means for controlling said headlamp, said light control means including:
an illuminance detector; and
a light controller for automatically controlling said headlamp based on illuminance L detected by said illuminance detector;
wherein said light controller causes said headlamp to be turned on when illuminance L detected by said illuminance detector is less than a first set lux L1;
wherein said light controller causes said headlamp to be turned off when illuminance L detected by said illuminance detector is greater than a second set lux L2; and
wherein said second set lux L2 is lighter than said first set lux L1.

* * * * *